United States Patent [19]

Fry et al.

[11] Patent Number: 4,614,556
[45] Date of Patent: Sep. 30, 1986

[54] METHOD FOR MAKING DECORATIVE PRODUCT

[75] Inventors: William F. Fry, Columbia; Rickie L. Sitler, Wrightsville, both of Pa.

[73] Assignee: Armstrong World Industries, Inc., Lancaster, Pa.

[21] Appl. No.: 600,377

[22] Filed: Apr. 16, 1984

[51] Int. Cl.$^4$ .......................... B32B 5/18; B32B 31/14
[52] U.S. Cl. ...................... 156/78; 156/246; 156/231
[58] Field of Search .............. 428/158, 172, 520; 156/231, 232, 238, 242, 246, 78, 79

[56] References Cited

U.S. PATENT DOCUMENTS

| | | | |
|---|---|---|---|
| 1,728,397 | 9/1929 | Dearden | 428/172 X |
| 2,718,674 | 9/1955 | Hinds | 428/172 X |
| 3,453,171 | 7/1969 | Crowley | 428/141 X |
| 3,577,311 | 5/1971 | Reiter et al. | 428/520 X |
| 3,775,212 | 11/1973 | Iwasaki et al. | 428/172 X |
| 3,958,054 | 5/1976 | McKee, Jr. et al. | 428/172 |
| 4,121,016 | 10/1978 | Garrison, Jr. | 428/520 X |
| 4,242,398 | 12/1980 | Segawa et al. | 428/172 |
| 4,259,386 | 3/1981 | Wagstaffe | 428/159 |
| 4,310,370 | 1/1982 | Arai et al. | 428/141 X |
| 4,360,558 | 11/1982 | Miura et al. | 428/159 |

Primary Examiner—Nancy A. B. Swisher

[57] ABSTRACT

A method for making a decorative product is provided which includes forming on a top layer of polymeric material (e.g., polyvinyl chloride) a relief pattern, and bonding said top layer to a base layer of a thermoplastic ethylene interpolymer (e.g., an ethylene-vinyl acetate copolymer).

The product is useful as a floor or wall covering.

19 Claims, 7 Drawing Figures

METHOD FOR MAKING DECORATIVE PRODUCT

FIELD OF THE INVENTION

The present invention relates to decorative products that are suitable as surface coverings for floors, walls, etc., and, more particularly, is directed to a decorative product of unitary construction having differential surface texture.

BACKGROUND OF THE INVENTION

Generally speaking, decorative products useful as surface coverings for floors are well-known in the art and have achieved broad use in both domestic and commercial environments. For example, decorative laminates in the form of sheet material of a resinous polymer composition, e.g., polyvinyl chloride, on a suitable substrate, e.g., a fibrous backing sheet, have been used for many years as sheet flooring. A goal common to all manufacturers of sheet flooring is to provide flooring products having appealing surface decorative effects that are both attractive from an aesthetic viewpoint and useful from a functional standpoint. To illustrate, many methods and processes such as mechanical embossing, chemical embossing or inlaying have been utilized to provide contrasting surface finishes and thereby impart decorative effects to the sheet flooring. For example, U.S. Pat. Nos. 3,000,754; 3,121,642 and 4,298,646 each discloses different techniques or means for making floor covering products such as floor tiles or sheet flooring having decorative surface effects.

SUMMARY OF THE INVENTION

According to the present invention there is provided a decorative product suitable as a floor covering comprising a top layer of synthetic organic polymeric material having a relief pattern including a plurality of individual raised segments extending upwardly on the surface of said top layer each surrounded by interconnected substantially uniplanar recessed segments, and a base layer bonded to said top layer of flexible, synthetic organic polymeric material comprising a thermoplastic ethylene interpolymer (e.g., an ethylene-vinyl acetate copolymer).

According to the present invention there is further provided a method for making a decorative product having differential surface texture, said method comprising forming a top layer of synthetic, organic polymeric material to provide a plurality of individual raised segments extending upwardly on the surface of said top layer each surrounded by interconnected substantially uniplanar recessed segments, followed by uniting said top layer to a flexible base layer comprising a thermoplastic ethylene interpolymer (e.g., an ethylene-vinyl acetate copolymer).

DETAILED DESCRIPTION OF THE INVENTION

Referring to FIGS. 1 to 4, the decorative product 10 of the invention comprises a substrate member 11 which may be referred to as a base layer or backing member. The substrate member or element 11 bears a top layer 12 of synthetic organic polymeric material. Layer 12 of product 10 is often referred to as a "wear layer" when the product is used as a covering for floors. The decorative product of the invention as shown in FIGS. 1 to 4 is of unitary construction wherein the elements or components thereof described hereinabove have been fused by heat in accordance with the method described hereinafter.

Figure 1:
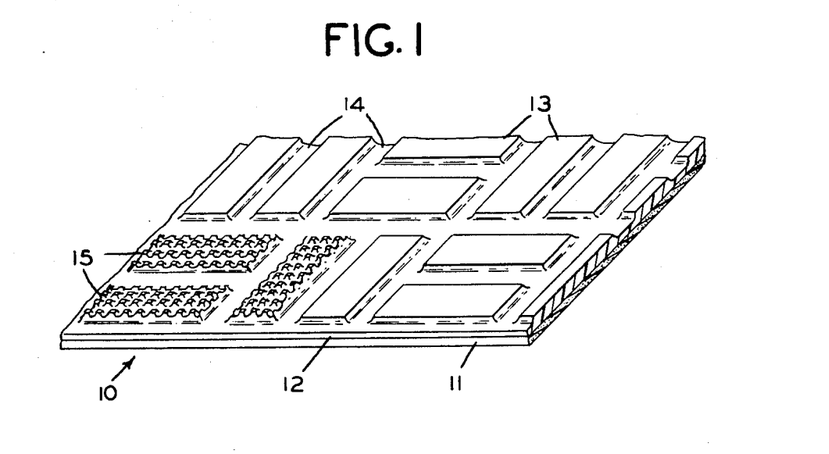
FIG. 1 is a view in perspective depicting the arrangement of elements and structural features of the decorative laminate of the invention.

As shown in FIG. 1, the fused, decorative product of the invention is characterized by unique surface features comprising raised segments or regions 13 separated by adjacent regions 14. The raised surface regions 13 have a greater thickness than adjacent regions or valleys 14 thereby creating an embossed effect. Notably, the embossed effect of the decorative product can be achieved without employing secondary or additional measures such as chemical or mechanical treatment of the product. Also, raised regions 13 can be made to exhibit a textured surface 15 which can be rougher and of lower gloss as desired than adjacent regions 14 which can be smoother and of higher gloss. Thus, the texture and gloss of adjacent regions 13 and 14 can be varied as desired to achieve different visual effects.

The elements of decorative product 10 will be described individually herebelow in conjunction with a description of the method for combining these elements to make the decorative product.

THE WEAR LAYER

The top or wear layer 12 is a thermoplastic layer or film of synthetic organic polymeric material having a thickness of up to about 30 mils. The wear layer 12 can be either clear, translucent, opaque, printed or filled with suitable additive materials. Preferably, the wear layer 12 is a film of polyvinyl chloride which is either semi-rigid or rigid (containing up to 20% plasticizer) having a suitable thickness (e.g., up to about 30 mils, and preferably between 18 and 22 mils) prepared by either extrusion casting or calendering techniques.

As shown in FIGS. 1 to 4, the top wear layer 12 has a plurality of individual raised segments 13 which extend upwardly on the surface thereof. Each raised segment 13 is surrounded by interconnecting substantially uniplanar recessed segments 14 that can be referred to as "valleys." The overall arrangement of raised segments 13 and valley segments 14 provides a relief pattern characteristic of an embossed surface. Also, the surface or top of each raised segment 13 can be textured to provide a shallow relief pattern 15. The configuration of wear layer 12 can provide differential height, differential texture and differential gloss features as desired to impart an overall pleasing aesthetic quality which is eminently desirable in floor covering products.

THE BASE LAYER

The base layer 11 of the decorative product of the invention is of synthetic organic polymeric material, of either thermoplastic or thermoset functionality, having a thickness of up to about 100 mils. Preferably, the base layer is of thermoplastic polymeric material and is pliable, i.e., can be wound into a roll when in sheet form. Most preferably, the base layer is formed of a thermoplastic ethylene interpolymer such as, for example, an ethylene-vinyl acetate copolymer.

Suitable ethylene interpolymers include copolymers of, for example, the following monomeric units: ethylene and vinyl acetate; ethylene and acrylic acid; ethylene and methacrylic acid; ethylene and ethyl acrylate; ethylene and isobutyl acrylate; ethylene and methyl methacrylate; ethylene, vinyl acetate and carbon monoxide. The preferred ethylene interpolymer is that which is derived by copolymerizing ethylene and vinyl acetate monomers.

Additional suitable ethylene interpolymers include a mixture of two or more ethylene interpolymers such as those mentioned above.

The thermoplastic polymeric material of base layer 11 preferably contains a significant amount of inorganic pigments or fillers. Suitable fillers include calcium carbonate, barium sulfate, hydrated alumina, clay, magnesium carbonate, calcium sulfate, silica, mixtures of the foregoing enumerated materials. Up to about 90 percent by weight of filler material can be used in the base layer, and the preferred range of filler is between about 40% and about 80% by weight (based upon the total weight of the base layer). The filled thermoplastic composition of the base layer 11 can be extruded by conventional techniques into shaped structures such as sheets. The shaping capability of the filled thermoplastic composition greatly simplifies the manufacture of the decorative product of the invention as explained hereinbelow.

Additional ingredients also can be present in the thermoplastic composition of base layer 11. For example, modifying resins, cross-linking agents, antioxidants, plasticizers, flame retardants, foaming agents, and similar additives that are conventionally used in polymeric compositions to achieve better properties, can be included in the composition of base layer 11. To illustrate, modifying resins such as elastomeric polymers (e.g., ethylene-propylene rubber or similar vulcanizable or cross-linkable elastomers) which impart flexibility and exhibit good compatibility can be used in the composition of base layer 11.

Other modifying resins useful in the composition of base layer 11 include low density branched homopolymers of ethylene, high density linear homopolymers of ethylene, linear copolymers of ethylene and other olefin monomers, homopolymers of propylene, and copolymers of propylene and ethylene. These modifying resins can be present in an amount up to about 50% by weight, preferably about 15% by weight, of the total weight of base layer 11.

The composition of base layer 11 can be prepared in conventional mixers such as the batch-type Banbury mixer or the continuous Farrell mixer. In practice, the dry ingredients are charged to the mixer device in routine fashion followed by adding the liquid ingredients (which can be pre-blended). Masterbatch techniques can be employed for compounding the polymeric materials followed by adding the filler and other ingredients to the masterbatch of polymeric materials. The composition of base layer 11 can be compounded as above described at temperatures between 300° F. and 375° F.

The preparation of the composition of base layer 11 having high filler content is facilitated by the use of suitable processing oils (paraffinic, aromatic or naphthenic) and accompanying compounding techniques disclosed in, for example, U.S. Pat. Nos. 4,191,798 and 4,379,190.

Base layer 11 has been satisfactorily prepared from KELDAX resins available from E. I. Dupont de Nemours and Company, Inc., Wilmington, Del. The KELDAX resins are thermoplastic ethylene interpolymer compositions which contain a high level of inorganic filler (e.g., calcium carbonate). The KELDAX resins are available in the form of pellets which can be extruded, calendered or molded using conventional equipment, or granulated for use in the manner disclosed hereinafter.

Figure 2:
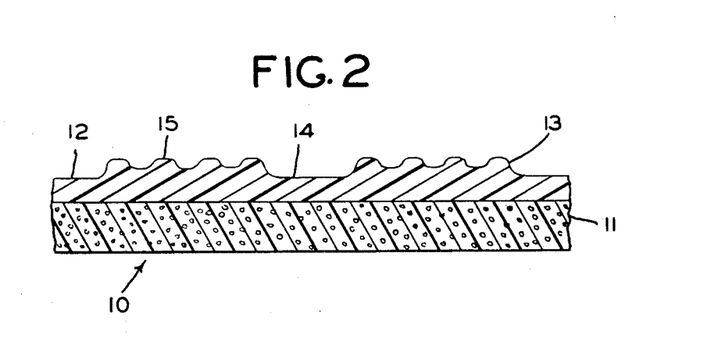
FIG. 2 is a cross-sectional view of the decorative product of FIG. 1.
Figure 3:
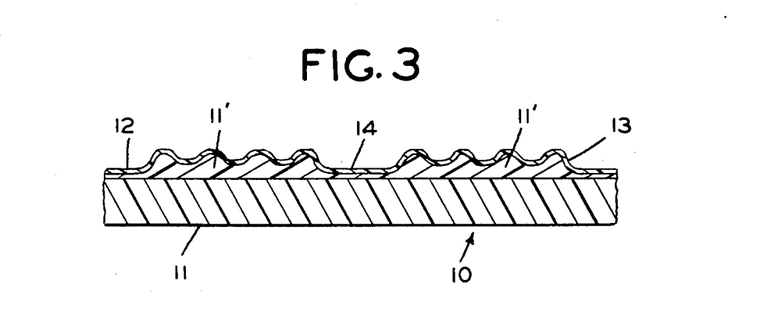
FIG. 3 is a cross-sectional view of a decorative product similar to that of FIG. 1 but having a different construction.

As shown in FIGS. 1 to 4, the configuration of base layer 11 can be varied as desired to provide different constructions of the decorative product of the invention. For example, FIG. 2 illustrates an embodiment in which base layer 11 is united to a top wear layer 12 that has surface textures as shown in FIG. 1 which can be imparted to wear layer 12 as by embossing or molding techniques; also, base layer 11 has a foamed or cellular matrix. FIG. 3 illustrates a different construction of decorative product 10 in which a material 11' fills the cavity area under each raised segment 13 to which base layer 11 is bonded. Filler material 11' and base layer 11 can be of the same or different polymeric material; preferably, filler material 11' and base layer 11 are the same thermoplastic ethylene interpolymer (e.g., ethylene-vinyl acetate copolymer).

Figure 4:
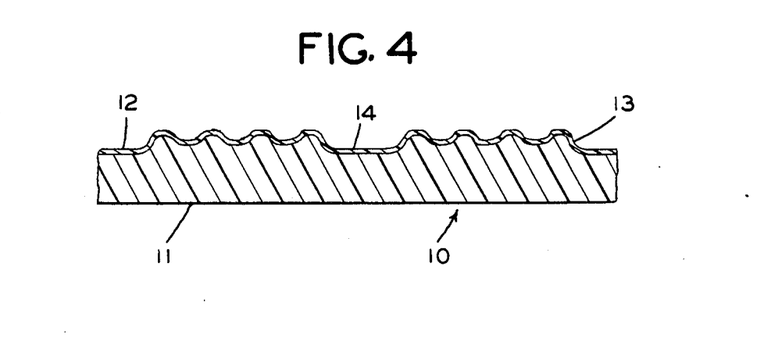
FIG. 4 is a cross-sectional view of a decorative product also similar to that of FIGS. 1 and 2, but of a still different construction.

A yet different embodiment of decorative product 10 is shown in FIG. 4 in which base layer 11 is a unitary matrix that extends into the cavity area under each raised segment 13 to which base layer 11 is bonded. This construction of decorative product 10 is achieved by applying base layer 11 directly to a pre-formed top layer 12 in the manner more fully described hereinbelow.

METHOD OF MANUFACTURE

Figure 5:
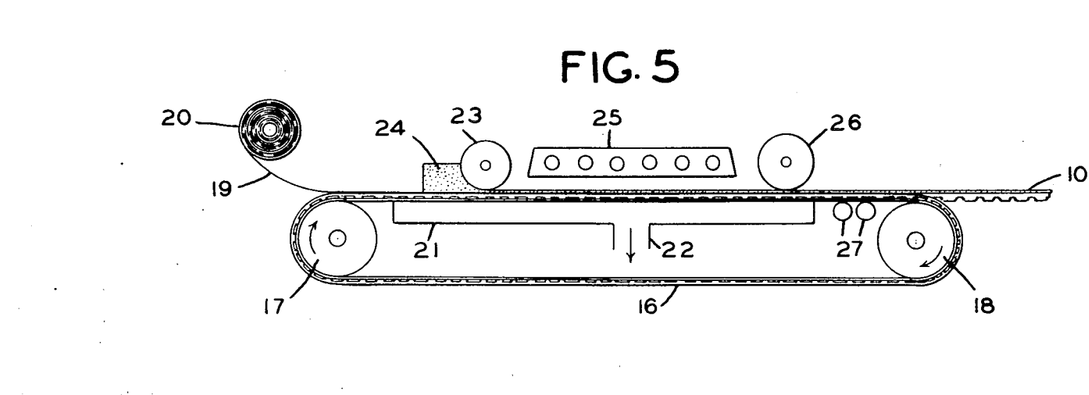
FIG. 5 is a side elevation view of an apparatus for the continuous manufacture of the decorative product of FIGS. 3 and 4.

Referring specifically to FIG. 5, a forming or casting belt assembly is depicted which is constructed to travel continuously in a horizontal path. More specifically, a casting belt 16 is suitably mounted in cooperative association or engagement with spaced rollers or pulleys 17 and 18 which rotate in the direction indicated by the arrows on FIG. 5. Preferably, pulley 17 is connected to a power source (not shown) for imparting motion to the casting belt assembly. In operation, a heat-softened film 19 of thermoplastic organic polymeric material, e.g., polyvinyl chloride, is deposited onto the patterned continuous casting belt 16. Film 19 can be either a solid film that is unrolled from a holding roll 20 and conveyed past a heating source, e.g., infra-red radiant heater (not shown), to heat-soften the film structure immediately prior to depositing the film onto casting belt 16. Alternatively, film 19 can be extruded from a suitable heated film die (not shown) and deposited directly onto the casting belt 16. Film 19 is heated to a temperature between about 275° F. and 375° F.

The thickness of film 19 can range from under 10 mils to over 20 mils depending upon performance and appearance qualities desired in the intended product. For a decorative floor covering product having exceptional wear quality, the thickness of film 19 is preferably in the 20 to 25 mil range.

Heat-softened film 19 is next conveyed on casting belt 16 over a suction box 21. The suction box 21 can be constructed of any suitable material, e.g., sheet metal, and is constructed in the form of a shallow rectangular pan having an outlet member 22 connected to a suction device, e.g., vacuum pump or centrifugal blower (not shown), for exhausting air from the suction box 21. In operation, suction box 21 creates a pressure differential across the thickness direction of heat-softened film 19 being conveyed thereover, whereby compressive forces thereby created on the top surface of film 19 force film 19 into the patterned surface of casting belt 16. Film 19, being heat-softened, readily assumes the reverse pattern of casting belt 16. For instance, film 19 is drawn into the cavity portions or segments of casting belt 16 and thus itself becomes patterned. In this manner, the cavity segments of the casting belt 16 impart raised segments 13 on wear layer 12.

Film 19, after having been patterned in the manner described hereinabove, is conveyed beneath a screed roll device 23 for applying thereto a suitable hot-melt composition having a granular form 24. The granular hot-melt composition 24 is preferably an organic thermoplastic polymeric material, e.g., a copolymer of ethylene and vinyl acetate, which contains a high amount of inorganic filler material, e.g., calcium carbonate. For example, the granular hot-melt of ethylene-vinyl acetate can contain up to about 80% by weight of calcium carbonate.

Film 19, after having been patterned and having granular hot-melt 24 applied thereto, is conveyed successively beneath first a heater 25, e.g., radiant heaters, which heat the granular hot-melt material, and a consolidation roll device 26 which presses upon and densifies the granular hot-melt 24, and thereby provides a consolidated layer of flexible material which corresponds to the base layer 11 of decorative product 10 described hereinabove and illustrated in FIGS. 1 to 4.

Alternatively, base layer 11 can be applied to patterned film 19 by direct extrusion from a heated extruding die or by applying a curable and fusible liquid composition (by blade, roll or spray techniques), followed by either extrusion leveling or liquid curing as film 19 travels on casting belt 16 and over suction box 21.

Film 19, after having been patterned and back-filled in the manner described hereinabove, is conveyed over cooling device 27, e.g., pipes or ducts for directing cool air against film 19, to cool the resulting decorative product thereby to ensure retention of the pattern imparted thereon and facilitate the subsequent removal thereof from casting belt 16. The decorative product can be conveyed directly from casting belt 16 to a winding roll device (not shown) or to a stamping unit (not shown) for cutting into individual pieces, e.g., flooring tiles.

Figure 6:
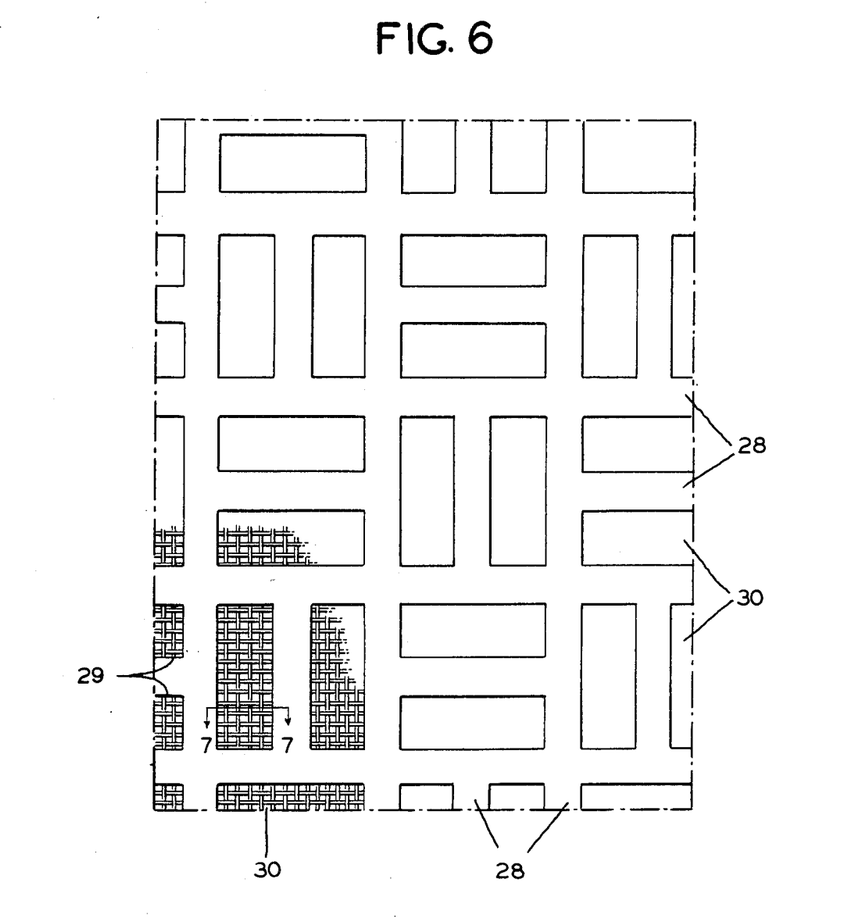
FIG. 6 is a plan view of the casting belt of the apparatus of FIG. 5.
Figure 7:
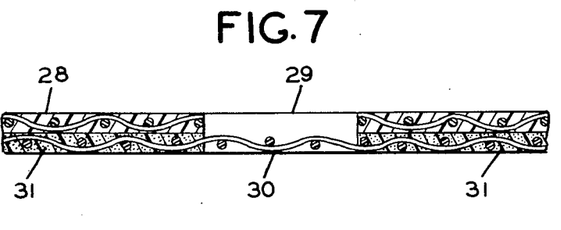
FIG. 7 is a cross-sectional view of the casting belt of FIG. 6 taken along line 7'—7'.

The design and operation of continuous casting belt 16 can be better understood by reference to FIGS. 6 and 7 and the following description. Specifically, casting belt 16 is of composite construction and comprises two separate layers adhesively bonded together. The top layer 28 of belt 16 comprises a fabric belt of nonporous construction (e.g., silicone rubber coated glass fabric). Top layer 28 is patterned by cutting a plurality of openings 29 of any desired shape, size and spacing in the body of the belt material. The thickness of top layer 28 controls the dimension of the raised segments 13 of wear layer 12; also the surface texture of top layer 28 is duplicated in the valley areas 14 of decorative product 10.

The base layer 30 of belt 16 comprises a fabric belt of porous construction (e.g., glass fabric having a nonstick coating and an open mesh). The texture of the porous fabric of layer 30 is imparted or duplicated on the raised segments 13 of decorative product 10 thereby creating textured surface 15 on raised regions 13 of decorative product 10 described hereinabove. The base layer 30 is bonded to top layer 28 by impregnating a suitable high-temperature resistant adhesive 31, e.g., silicone RTV adhesive, into the mesh structure of layer 30 at selected areas or locations (e.g., along the belt edges) followed by contacting layers 28 and 30 in the desired alignment and curing the adhesive.

The continuous casting belt 16 is conveniently fabricated by splicing together the ends thereof in a shiplap fashion with silicone RTV adhesive.

BONDING BASE LAYER TO WEAR LAYER

A salient feature of the present invention resides in the manner of bonding the base layer 11 and the wear layer 12 to achieve a decorative product 10 of unitized construction.

Generally speaking, a base layer 11 consisting of an ethylene-vinyl acetate copolymer does not adhere well to a wear layer 12 of polyvinyl chloride, especially if the base layer contains a high amount of inorganic fillers (e.g., calcium carbonate). It is known to adhere a high filler content base material such as base layer 11 to a polyvinyl chloride layer such as wear layer 12 by a key or intermediate coating or layer between the wear layer and the base layer. For example, a key or intermediate coating of a carboxylated ethylene-vinyl acetate terpolymer can be applied either as a solvent solution or in the form of a hot-melt coating directly to the underside of the polyvinyl chloride wear layer followed by applying to the key or intermediate coating the granular hot-melt 24 and thereby achieve bonding of base layer 11 to wear layer 12. But this technique requires the additional method or process step of applying the key coating to the wear layer.

The additional process step can be avoided by utilizing a composition for base layer 11 comprising a blend or mixture of a high filler content ethylene-vinyl acetate copolymer and a carboxylated ethylene terpolymer.

Suitable carboxylated ethylene terpolymers include copolymers of between about 40% and about 80% by weight of ethylene, between about 3% and about 30% by weight of carbon monoxide, and between about 50% and about 60% by weight of a copolymerizable ethylenically unsaturated monomer. The latter ethylenically unsaturated monomer can be selected from the group consisting of unsaturated mono-dicarboxylic acids of 2-20 carbon atoms, esters of said unsaturated mono- or dicarboxylic acids, vinyl esters of saturated carboxylic acids wherein the acid group contains 1-18 carbon atoms, vinyl alkyl ethers wherein the alkyl group contains 1-18 carbon atoms, acrylonitrile, methacrylonitrile, norbornene, alpha-olefins containing 3-12 carbon atoms, and vinyl aromatic compounds.

The preferred terpolymer comprises 40%-80% by weight ethylene, 3% to 15% by weight carbon monoxide, and 5% to 50% by weight vinyl acetate.

The aforementioned terpolymers can be blended in granular form with the high-filler containing ethylene-vinyl acetate copolymer described hereinabove, and the blend can be extruded directly onto the thermoformed top or wear layer 12 to provide decorative product 10 of the invention. Alternatively, the granulated blend can be used as the granular hot-melt 24 which is applied and densified in the manner described hereinabove, particularly with reference to FIG. 5.

Suitable carboxylated ethylene terpolymers include ELVALOY 741 and ELVALOY 742 resins available from E. I. Dupont de Nemours and Co., Inc., Wilmington, Del. Good bonding of the base layer 11 to wear layer 12 has been achieved by utilizing a base layer 11 composed of about 27% by weight ethylene-vinyl acetate copolymer, 63% by weight of calcium carbonate filler and 10% by weight of carboxylated ethylene terpolymer, wherein all percentages are based upon the total weight of the polymeric and filler components. More specifically, the base layer 11 of decorative product 10 preferably consists of the blend of the copolymer and terpolymer and is applied to wear layer 12 by either depositing the blend from a hot extruding die directly onto the undersurface of wear layer 12 or by depositing, heating, consolidating and curing a granular hot-melt of the blend in the manner described hereinabove for granular hot-melt 24. For instance, the preferred constructions of decorative product 10 shown in FIGS. 3 and 4 can be conveniently prepared by extruding the blend of copolymer and terpolymer resins directly onto the undersurface of top or wear layer 12, or by depositing, heating, consolidating and curing the blend of granular polymers in the manner described in relation to the method and operation of the apparatus of FIG. 5.

A foamed or cellular base layer 11 can be formed conveniently by incorporating from about 0.05% and about 0.3% by weight of suitable blowing agents that decompose at a temperature in the range of between about 300° F. and about 350° F. To illustrate, a foamed base layer of a blend of KELDAX resin and ELVALOY 742 resin was made by incorporating 0.25% by weight of Kempore AF blowing agent into the resin blend with 0.19% by weight of zinc oxide activator. When extruded, the resin blend exhibited a foaming action upon exiting the extruder die and remained foamed upon and after being deposited onto the underside of top or wear layer 12.

What is claimed is:

1. A method for making a decorative product suitable as a floor covering comprising
   forming on a top layer of synthetic organic polymeric material a relief pattern including a plurality of individual raised segments extending upwardly on one surface of said top layer each surrounded by interconnected substantially uniplanar recessed segments by
      advancing a heat-softened sheet of said synthetic organic polymeric material over casting means having a patterned surface thereon, and
      applying pressure to one surface of said heat-softened sheet of synthetic organic polymeric material to conform said sheet to the patterned surface of said casting means
   thereby to impart on said sheet of synthetic organic polymeric material the reverse pattern of the patterned surface of said casting means, and
      uniting said patterned top layer to a base layer comprising a thermoplastic ethylene interpolymer selected from the group consisting of ethylene and vinyl-acetate; ethylene and acrylic acid; ethylene and methacrylic acid; ethylene and ethyl acrylate; ethylene and butyl or isobutyl acrylate; ethylene and methyl methacrylate; ethylene, vinyl acetate and methacrylic acid; and ethylene vinyl acetate and carbon monoxide, and mixtures of said copolymers by bonding the reverse side of said relief pattern on said top layer to said base layer.

2. The method of claim 1 wherein said top layer is comprised of a polyvinyl chloride homopolymer or copolymer.

3. The method of claim 2 wherein the ethylene content of said copolymer is between about 50% by weight and about 85% by weight, based upon the total copolymer weight.

4. The method of claim 3 wherein said base layer comprises between about 5% and about 60% by weight of said copolymer of ethylene, based upon the total weight of said base layer.

5. The method of claim 4 wherein said base layer includes between about 40% by weight and about 90% by weight, based upon the total weight of said base layer, of a filler.

6. The method of claim 5 wherein said filler is selected from the group consisting of calcium carbonate, barium sulfate, hydrated alumina, clay, magnesium carbonate, calcium sulfate, silica, flyash, cement dust, wood flour, ground rice hulls and mixtures thereof.

7. The method of claim 6 wherein said base layer is a foamed or cellular matrix of a thermoplastic ethylene interpolymer.

8. The method of claim 6 wherein said base layer contains between 0 and 15% by weight, based upon the total weight of said base layer, of a plasticizer.

9. The method of claim 8 wherein said plasticizer is selected from the group consisting of processing oils, polyesters, polyethers, polyether esters and mixtures thereof.

10. The method of claim 9 wherein said processing oil plasticizer is selected from the group consisting of napthenic and aromatic oils.

11. The method of claim 10 or 10 wherein said base layer contains between 0 and about 50% by weight, based upon the total weight of said base layer, of a modifying resin selected from the group consisting of olefin polymers, elastomeric polymers and mixtures thereof.

12. The method of claim 11 wherein said olefin modifying resin is selected from the group consisting of low density branched polyethylene, high density linear polyethylene, linear copolymers of ethylene, polypropylene and copolymers of propylene and ethylene having an ethylene content of up to about 20% by weight.

13. The method of claim 12 wherein said base layer is a foamed or cellular matrix of a thermoplastic ethylene interpolymer.

14. The method of claim 12 wherein said base layer is bonded to said top layer by a key layer therebetween of a carboxylated ethylene terpolymer.

15. The method of claim 14 wherein said base layer is a foamed or cellular matrix of a thermoplastic ethylene interpolymer.

16. The method of claim 12 wherein said base layer is bonded directly to said top layer and comprises a mixture of a thermoplastic ethylene interpolymer and a carboxylated ethylene terpolymer.

17. The method of claim 16 wherein said carboxylated ethylene terpolymer comprises between about 40% and about 80% by weight ethylene, between about 3% and about 15% by weight of carbon monoxide, and between about 5% and about 50% by weight of vinyl acetate.

18. The method of claim 17 wherein the ratio of thermoplastic ethylene interpolymer-to-carboxylated ethylene terpolymer is between 1:1 and 3:1.

19. The method of claim 18 wherein said base layer is a foamed or cellular matrix of said mixture of thermoplastic interpolymer and carboxylated ethylene terpolymer.

* * * * *

UNITED STATES PATENT AND TRADEMARK OFFICE
CERTIFICATE OF CORRECTION

PATENT NO. : 4,614,556

DATED : September 30, 1986

INVENTOR(S) : William F. Fry et al

It is certified that error appears in the above—identified patent and that said Letters Patent are hereby corrected as shown below:

In the Claims, claim 11, column 8, line 40, the words "claim 10 or 10" should read --claim 9 or 10--.

Signed and Sealed this

Twenty-third Day of December, 1986

Attest:

DONALD J. QUIGG

Attesting Officer

Commissioner of Patents and Trademarks